US008020338B2

United States Patent
Brown

(10) Patent No.: US 8,020,338 B2
(45) Date of Patent: Sep. 20, 2011

(54) SPITTING WEEDLESS SURFACE FISHING LURE

(76) Inventor: Roger Lee Brown, Crown Point, NY (US)

(*) Notice: Subject to any disclaimer, the term of this patent is extended or adjusted under 35 U.S.C. 154(b) by 74 days.

(21) Appl. No.: 12/229,709

(22) Filed: Aug. 26, 2008

(65) Prior Publication Data
US 2010/0050497 A1 Mar. 4, 2010

(51) Int. Cl.
*A01K 85/00* (2006.01)
*A01K 85/01* (2006.01)

(52) U.S. Cl. .................. 43/42.02; 43/42.06; 43/42.24; 43/42.26; 43/42.36; 43/42.47

(58) Field of Classification Search ............ 43/42.47, 43/42.02, 42.03, 42.24, 42.26, 42.28, 42.29, 43/42.39, 42.36, 42.06
See application file for complete search history.

(56) References Cited

U.S. PATENT DOCUMENTS

| | | | | |
|---|---|---|---|---|
| 696,433 | A * | 4/1902 | Heddon | 43/42.47 |
| 1,109,439 | A * | 9/1914 | Maus | 43/42.36 |
| 1,154,168 | A * | 9/1915 | Bosserman | 43/42.28 |
| 1,495,832 | A * | 5/1924 | Aiken | 43/42.47 |
| 1,601,267 | A * | 9/1926 | Svalgaard | 43/42.36 |
| 1,602,329 | A * | 10/1926 | Bonnett | 43/42.47 |
| 1,701,528 | A * | 2/1929 | Clewell | 43/42.36 |
| 1,801,940 | A * | 4/1931 | Stanley | 43/42.28 |
| 1,833,522 | A * | 11/1931 | Goble | 43/42.47 |
| 1,846,538 | A * | 2/1932 | Albers et al. | 43/42.47 |
| 1,888,221 | A * | 11/1932 | Coffin | 43/42.02 |
| 1,926,459 | A * | 9/1933 | Sisco | 43/42.47 |
| 2,129,245 | A * | 9/1938 | Stenstrom | 43/42.06 |
| 2,231,507 | A * | 2/1941 | Richards | 43/42.47 |
| 2,234,077 | A * | 3/1941 | Hayley, Jr. | 43/42.02 |
| 2,290,433 | A * | 7/1942 | Jeffers | 43/42.02 |
| 2,295,765 | A * | 9/1942 | Weber | 43/42.47 |
| 2,306,181 | A * | 12/1942 | Neumann | 43/42.35 |
| 2,387,255 | A * | 10/1945 | Godlewski | 43/42.06 |
| 2,429,568 | A * | 10/1947 | Stevermer | 43/42.28 |
| 2,450,988 | A * | 10/1948 | Putnam et al. | 43/42.24 |
| 2,462,828 | A * | 2/1949 | Parnell, Sr. | 43/42.47 |
| 2,495,134 | A * | 1/1950 | Roberts | 43/42.22 |
| 2,523,536 | A * | 9/1950 | Maddux | 43/42.03 |

(Continued)

FOREIGN PATENT DOCUMENTS

FR 2625867 A1 * 7/1989

(Continued)

*Primary Examiner* — Darren W Ark
(74) *Attorney, Agent, or Firm* — Schmeiser, Olsen & Watts LLP

(57) ABSTRACT

A surface floating fishing lure including a forwards facing concave surface located at the water line, designed to scoop, redirect, and "spit" water into the air to subsequently splash unto the surface of the water when the fishing lure is tugged sharply, whereby a surface disturbance is created to attract fish hiding under cover of lily pads and other floating weeds or debris. This fishing lure shall include at least one fish hook rigged to be weedless, containing a flexible member deflecting weeds and debris away from each barbed point, a forwards facing concaved surface oriented in a manner predetermined to be suitable to redirect and splash a spray of water across the water surface, a floating body, a fish line connecting means at the forwards end of said fishing lure, and may, in some embodiments, further include at least a portion of said floating body in the form of a soft polymer flexible body in a shape resembling natural fish prey such as worms, frogs, minnows, centipedes, and etc.

4 Claims, 5 Drawing Sheets

U.S. PATENT DOCUMENTS

Figure 1:
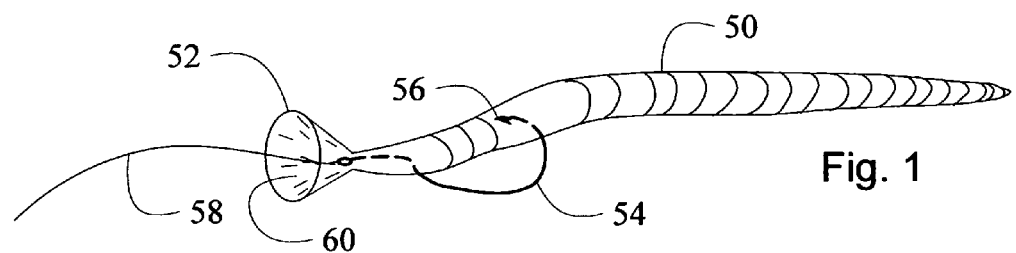

| Number | | Date | Name | Class |
|---|---|---|---|---|
| 2,534,482 | A * | 12/1950 | Terhorst | 43/42.02 |
| 2,567,787 | A * | 9/1951 | Sahutski | 43/42.02 |
| 2,572,608 | A * | 10/1951 | Gabor | 43/42.24 |
| 2,578,786 | A * | 12/1951 | Davis | 43/42.04 |
| 2,619,760 | A * | 12/1952 | Maddux | 43/42.15 |
| 2,651,133 | A * | 9/1953 | Sharps | 43/42.28 |
| 2,690,026 | A * | 9/1954 | King | 43/42.02 |
| 2,708,805 | A * | 5/1955 | Garvie | 43/42.15 |
| 2,738,611 | A * | 3/1956 | Miller | 43/42.02 |
| 2,763,085 | A * | 9/1956 | Caillier | 43/42.02 |
| 2,764,836 | A * | 10/1956 | Webber | 43/42.47 |
| 2,775,839 | A * | 1/1957 | Kuslich | 43/42.47 |
| 2,791,859 | A * | 5/1957 | Wentworth | 43/42.02 |
| 2,793,460 | A * | 5/1957 | Mutchler | 43/42.47 |
| 2,794,287 | A * | 6/1957 | Mancuis, Jr. | 43/42.02 |
| 2,813,365 | A * | 11/1957 | Cross | 43/42.02 |
| 2,820,315 | A * | 1/1958 | Lowe | 43/42.35 |
| 2,847,791 | A * | 8/1958 | Simmons | 43/42.26 |
| 2,852,881 | A * | 9/1958 | Higdon | 43/42.02 |
| 2,869,279 | A * | 1/1959 | Pretorius | 43/42.06 |
| 2,878,612 | A * | 3/1959 | Netherton et al. | 43/42.47 |
| 2,910,799 | A * | 11/1959 | Wentworth | 43/42.02 |
| 2,912,784 | A * | 11/1959 | Carlin | 43/42.24 |
| 2,927,392 | A * | 3/1960 | Lievense et al. | 43/42.47 |
| 2,932,112 | A * | 4/1960 | Graves, Jr. | 43/42.02 |
| 2,964,870 | A * | 12/1960 | Dishon | 43/42.02 |
| 3,047,975 | A * | 8/1962 | Pretorius | 43/42.06 |
| 3,100,360 | A * | 8/1963 | Creme | 43/42.02 |
| 3,108,389 | A * | 10/1963 | McGuire | 43/42.06 |
| 3,120,074 | A * | 2/1964 | Messler | 43/42.36 |
| 3,121,291 | A * | 2/1964 | Iffland, Jr. et al. | 43/44.81 |
| 3,162,971 | A * | 12/1964 | Gilliam | 43/42.3 |
| 3,220,139 | A * | 11/1965 | Bessler | 43/42.02 |
| D203,509 | S * | 1/1966 | Marino | D22/127 |
| 3,230,656 | A * | 1/1966 | Kozjak | 43/42.1 |
| 3,245,171 | A * | 4/1966 | Henry | 43/42.24 |
| 3,344,549 | A * | 10/1967 | Peters et al. | 43/42.47 |
| 3,376,663 | A * | 4/1968 | Amrine | 43/42.02 |
| 3,426,467 | A * | 2/1969 | Bryant | 43/42.36 |
| 3,490,165 | A * | 1/1970 | Thomassin | 43/42.47 |
| D222,058 | S * | 9/1971 | Meadors | 43/42.26 |
| 3,685,192 | A * | 8/1972 | Stibbard | 43/42.47 |
| 3,729,850 | A * | 5/1973 | Waters, Jr. | 43/42.47 |
| 3,740,891 | A * | 6/1973 | Rubenstein | 43/42.02 |
| 3,879,882 | A * | 4/1975 | Rask | 43/42.28 |
| 3,890,735 | A * | 6/1975 | Serrill | 43/42.24 |
| D237,492 | S * | 11/1975 | Zimmerman | 43/42.24 |
| D239,281 | S * | 3/1976 | Williams, Jr. | 43/42.24 |
| D239,447 | S * | 4/1976 | Radcliff | 43/42.26 |
| 3,978,606 | A * | 9/1976 | Riggs | 43/42.24 |
| 3,983,656 | A * | 10/1976 | Bain | 43/42.24 |
| 4,035,945 | A * | 7/1977 | Newman | 43/42.15 |
| 4,047,318 | A * | 9/1977 | Mapp | 43/42.24 |
| 4,060,928 | A * | 12/1977 | Messler et al. | 43/42.24 |
| 4,167,076 | A * | 9/1979 | Weaver | 43/42.36 |
| 4,196,884 | A * | 4/1980 | Zeman | 43/42.39 |
| 4,197,667 | A * | 4/1980 | Helfenstine et al. | 43/42.06 |
| 4,208,822 | A * | 6/1980 | Bryant | 43/42.02 |
| 4,316,343 | A * | 2/1982 | Creme | 43/42.24 |
| 4,317,305 | A * | 3/1982 | Firmin | 43/42.24 |
| 4,334,381 | A * | 6/1982 | Carver et al. | 43/42.29 |
| 4,367,607 | A * | 1/1983 | Hedman | 43/42.24 |
| 4,468,881 | A * | 9/1984 | Gordon, III | 43/42.28 |
| 4,592,161 | A * | 6/1986 | Smith et al. | 43/42.24 |
| 4,619,069 | A * | 10/1986 | Strickland | 43/42.26 |
| 4,649,663 | A * | 3/1987 | Strickland | 43/44.9 |
| 4,653,212 | A * | 3/1987 | Pixton | 43/42.24 |
| 4,672,768 | A * | 6/1987 | Pippert | 43/42.24 |
| 4,709,501 | A * | 12/1987 | Garst | 43/42.24 |
| 4,744,168 | A * | 5/1988 | McClellan | 43/42.36 |
| 4,790,101 | A * | 12/1988 | Craddock | 43/42.24 |
| 4,799,329 | A * | 1/1989 | Paulsen | 43/42.28 |
| 4,841,665 | A * | 6/1989 | McGahee | 43/42.24 |
| 4,856,223 | A * | 8/1989 | Evans | 43/42.24 |
| 4,862,628 | A * | 9/1989 | McGahee et al. | 43/42.24 |
| 4,870,775 | A * | 10/1989 | Schrader | 43/42.02 |
| 4,873,783 | A * | 10/1989 | McGahee et al. | 43/42.24 |
| 4,885,867 | A * | 12/1989 | Leal | 43/42.02 |
| 4,920,686 | A * | 5/1990 | McGahee et al. | 43/42.24 |
| 4,976,060 | A * | 12/1990 | Nienhuis | 43/42.41 |
| 4,998,372 | A * | 3/1991 | Reed | 43/42.24 |
| 5,009,024 | A * | 4/1991 | Parman | 43/42.24 |
| 5,035,075 | A * | 7/1991 | Pearce | 43/42.02 |
| 5,088,227 | A * | 2/1992 | Toner et al. | 43/42.02 |
| 5,119,581 | A * | 6/1992 | Rudolph | 43/42.28 |
| 5,142,811 | A * | 9/1992 | Freeman | 43/42.36 |
| 5,152,094 | A * | 10/1992 | Strickland | 43/42.24 |
| 5,167,088 | A * | 12/1992 | Wardall | 43/42.03 |
| 5,193,299 | A * | 3/1993 | Correll et al. | 43/42.47 |
| 5,321,905 | A * | 6/1994 | Higgins | 43/42.03 |
| 5,353,540 | A * | 10/1994 | Ward | 43/42.24 |
| 5,367,817 | A * | 11/1994 | Clark | 43/42.36 |
| 5,379,544 | A * | 1/1995 | Davidson | 43/42.24 |
| 5,428,918 | A * | 7/1995 | Garrison | 43/42.28 |
| 5,456,039 | A * | 10/1995 | Pisoni et al. | 43/42.24 |
| 5,465,523 | A * | 11/1995 | Garst | 43/42.24 |
| 5,517,781 | A * | 5/1996 | Paoletta, Jr. | 43/42.06 |
| 5,560,143 | A * | 10/1996 | Allen | 43/42.47 |
| 5,640,798 | A * | 6/1997 | Garst | 43/42.24 |
| 5,725,892 | A * | 3/1998 | Gibbs | 43/42.35 |
| 5,775,024 | A * | 7/1998 | Hnizdor | 43/42.37 |
| 5,918,406 | A * | 7/1999 | Wilson | 43/42.28 |
| 5,966,860 | A * | 10/1999 | Cox | 43/42.47 |
| 5,996,271 | A * | 12/1999 | Packer | 43/42.24 |
| 6,006,465 | A * | 12/1999 | Brown et al. | 43/42.36 |
| 6,266,916 | B1 * | 7/2001 | Dugan | 43/42.24 |
| 6,385,896 | B1 * | 5/2002 | Thomassin | 43/42.03 |
| 6,393,755 | B1 * | 5/2002 | Weaver | 43/42.03 |
| 6,408,565 | B1 * | 6/2002 | Duncan | 43/42.06 |
| 6,408,566 | B1 * | 6/2002 | Ward, Sr. | 43/42.24 |
| D462,413 | S * | 9/2002 | Teegarden | D22/126 |
| 6,564,499 | B1 * | 5/2003 | Firmin | 43/42.02 |
| 6,622,419 | B2 * | 9/2003 | Pearce | 43/42.28 |
| 6,675,525 | B1 * | 1/2004 | Ford | 43/42.36 |
| 6,860,058 | B2 * | 3/2005 | Ito | 43/42.28 |
| 6,895,711 | B1 * | 5/2005 | Nakamichi | 43/42.24 |
| 6,912,808 | B1 * | 7/2005 | Mak | 43/42.47 |
| D511,197 | S * | 11/2005 | Berdine | D22/126 |
| 7,114,285 | B1 * | 10/2006 | Ince | 43/42.26 |
| 7,152,361 | B2 * | 12/2006 | Berdine | 43/42.24 |
| 7,234,267 | B1 | 6/2007 | Konstant | |
| 7,263,798 | B2 * | 9/2007 | Nichols | 43/42.24 |
| 7,266,922 | B2 * | 9/2007 | Oelerich et al. | 43/42.24 |
| 7,559,172 | B2 * | 7/2009 | Hogan | 43/42.24 |
| 7,621,072 | B2 * | 11/2009 | Brasseur | 43/44.97 |
| 7,637,050 | B2 * | 12/2009 | Brick | 43/42.47 |
| 7,793,457 | B2 * | 9/2010 | Hogan | 43/42.24 |
| 2003/0046858 | A1 * | 3/2003 | Meraw | 43/42.28 |
| 2004/0216361 | A1 * | 11/2004 | Miller | 43/42.47 |
| 2006/0053680 | A1 * | 3/2006 | Petitjean | 43/42.47 |
| 2006/0096154 | A1 * | 5/2006 | Meroney | 43/42.47 |
| 2007/0163165 | A1 * | 7/2007 | Castro et al. | 43/42.06 |
| 2007/0199232 | A1 * | 8/2007 | Littlejohn | 43/42.24 |
| 2008/0202015 | A1 * | 8/2008 | Langer | 43/42.24 |
| 2008/0202017 | A1 * | 8/2008 | Gregory | 43/42.24 |
| 2008/0276521 | A1 * | 11/2008 | Turpin | 43/42.06 |
| 2008/0289244 | A1 * | 11/2008 | Parks | 43/42.02 |
| 2009/0183418 | A1 * | 7/2009 | Dahlberg | 43/42.47 |
| 2009/0307960 | A1 * | 12/2009 | Oelerich et al. | 43/42.47 |
| 2010/0011651 | A1 * | 1/2010 | Rapelje | 43/42.24 |
| 2010/0101137 | A1 * | 4/2010 | MacDonald | 43/42.02 |

FOREIGN PATENT DOCUMENTS

| | | | |
|---|---|---|---|
| FR | 2639512 A1 * | 6/1990 | |
| JP | 08051893 A * | 2/1996 | |
| JP | 11113448 A * | 4/1999 | |
| JP | 2001120114 A * | 5/2001 | |
| JP | 2003134969 A * | 5/2003 | |
| JP | 2004049101 A * | 2/2004 | |
| JP | 2005198511 A * | 7/2005 | |
| JP | 2005229824 A * | 9/2005 | |

* cited by examiner

SPITTING WEEDLESS SURFACE FISHING LURE

CROSS-REFERENCE TO RELATED APPLICATIONS

None

FEDERALLY SPONSORED RESEARCH

Not Applicable

SEQUENCE LISTING OR PROGRAM

Not applicable

BACKGROUND OF THE INVENTION

1. Field of Invention

This invention relates to weedless and surface floating fishing lures designed to "spit" or spray water across the water surface to attract hiding fish when rapidly retrieved and also relates to the method used to fish therewith.

2. Background of the Invention

In calm water fishing, large desirable fish, such as bass, frequently hide just below lily pads, floating logs, and surface weeds. These large fish prefer to strike, to ambush prey, from protective cover, under which they are safe from predators such as eagles. Such floating debris provides fish easy escape routes providing cover, camouflage, and hiding places. The largest of these fish frequently like to attack and swallow surface floating prey that splash, disturb the water, or generate noise as the prey swims or struggles on the surface. To be effective in such debris rich environments, fishing lures need to be weedless, designed in such a way that debris is deflected away from catching on the barbed point of any fish hooks.

As fish hiding places become denser, direct vision becomes less effective in initially attracting the attention of a fish. And, in the densest sort of debris, it is desirable to have a fishing lure that both floats at the surface of the water, and one that tends to be pulled over the top of floating debris without becoming snagged. Additionally, though not exclusively, flexible soft bodied fishing lures (such as artificial worms, artificial frogs, etc.) historically have particularly high success rates.

Weedless poppers are an example of a class of fishing lures designed to operate near the water surface, in a weedy environment, and create a surface disturbance to attract predator fish that might not be visually in their line of sight Existing fishing lures, such as weedless poppers, are not well suited to generating surface disturbance while still being able to be conveniently pulled over the top of lily pads and other floating debris. Fishing lures that sink or dive (such as poppers do), even a small distance into the water, will not tend to be pulled over the top of debris, resulting in snagging of the fish line. This is true even when the fishing lure's hooks are rendered weedless.

Poppers, and certain other existing floating fishing lures, may create a surface disturbance when jerked, but most cannot reliably be pulled over the top of surface weeds without snagging. This is sometimes due to the designed tendency of poppers to dive and swerve erratically when sharply tugged. A "surface floating" fishing lure must have a floating body of sufficient buoyancy that it will have essentially no tendency to dive when tugged.

Soft bodied lures, such as elastomeric polymer plastic worms, can be rendered highly buoyant, and be Texas rigged (without a sinker) so that the tip of their hooks are weedless. But, as presently available, these tend to produce only limited surface splashing of the sort preferred in attracting hiding fish.

It would appear to be desirable to combine weedless, surface floating fishing lures with a device that would enhance their ability to create surface disturbance whereby they may be sensed from a distance by large fish hiding under cover. In some cases it might also be desirable to combine these features with a soft bodied fishing lure resembling natural fish prey.

One particular means of generating a splash of water when a surface fishing lure is tugged forwards is to incorporate a forwards facing concave surface, such as a funnel shaped hollow cone, a funnel-like structure, or a forwards facing suction cup-like structure. This creates a "spitting fishing lure", one that essentially splashes or "spits" water into the air to subsequently splash unto the surface of the water when the fishing lure is sharply tugged. The resulting splash may generate sound and vibration in the water simulating large fish prey struggling violently at the surface.

U.S. Pat. No. 1,601,267, Sep. 28, 1926 to J. W. Svalgaard is an early example that teaches of a fishing lure containing such a forwards facing concave surface (a cone in this case) where the forwards facing cone is incorporated in sinking style of fishing lure. While the use of a forwards facing cone visually appears similar in structure to the present invention, a closer examination will reveal that the fishing lure is weighted, and flexibly coupled—with the specific intent of creating water turbulence below the surface that will result in the fishing lure following a snakelike path deep under the surface when retrieved at a steady rate through the water. It will not splash surface water when retrieved. It should also be noted that the fishing lure does not incorporate natural looking soft bodied bait, nor does it make any attempt at being weedless.

U.S. Pat. No. 4,790,101 Dec. 13, 1988 to Craddock reveals a semi-weedless fishing lure having a theory of operation similar to the previous citation. It has a flat clear plastic deflector plate designed to create a similar turbulence deep underwater. It's theory of operation supposedly results in a similar snakelike path underwater, as the fishing lure is retrieved at a steady rate. One particular embodiment of that fishing lure involved the use of wormlike bait attached to the hook. Note, however, that the fishing lure is inherently designed for subsurface retrieval at a steady rate, with its salient feature being the snakelike motion related to deep water retrieval. Also note that the hook is not rendered totally weedless by any means, particularly by Texas rigging of the bait, and that the deflector plate is flat, and would not generate significant surface water "spitting" even if this fishing lure were to be converted into a surface floating fishing lure.

Many patents exist for variations of "soft-bodied" or wormlike fishing lures, such as U.S. Pat. No. 5,142,811 Sep. 1, 1992 to Freeman. This patent reveals the insertion of a longitudinal tube inside a plastic worm, making it relatively easy to rig a hook near the tail of natural looking bait. It does not, however, teach of making the fishing lure to float, rendering it weedless, nor does it in any way attempt to generate splashing action on the surface when retrieved.

Weedless fishing lures incorporating a "Texas rigged hook" are well known, whereby the barbed portion of the hook is embedded in the body of soft polymer plastic bait. U.S. Pat. No. 4,334,381 Jun. 15, 1982 to Carver et al. reveals a "modified" Texas rigging displaying a hook embedded in the bait for a particularly weedless configuration. However, it is also a sinking type of fishing lure, does not splash surface water to attract fish, and is rigged in a very non-standard variation of Texas rigging.

U.S. Pat. No. 4,873,783 Oct. 17, 1989 to McGahee et al. and U.S. Pat. No. 4,196,884 Apr. 8, 1980 to Zeman both reveal soft bodied fishing lures intended to be Texas rigged in a manner that should render them weedless. Both incorporate a cavity in the fishing lure in the region where the barbed point of the fish hook will reside, allowing for easier penetration when rigging, and easier setting of the hook when bitten by a fish. Neither of these fishing lures is inherently designed for surface fishing. Neither are they designed to create splashing type of water disturbance. The cavities proposed inside the soft bodied fishing lures of these patents, however, may be incorporated in the present invention to good effect, when employing a soft polymer plastic floating body. This incorporation of a cavity would not in any way inhibit the operation of the present invention as described herein. Therefore it is stipulated that such cavities may be considered to be included in soft bodied embodiments of the present invention.

U.S. Pat. No. 4,619,069, Oct. 28, 1986, to Strickland teaches of a weedless Texas rigged double tailed worm fishing lure wherein the "flipper like" motion of the twin tails is designed to disturb the water and attract the attention of fish. This too is apparently intended to be a sinking fishing lure. If it were to be modified to render it to become a surface floating fishing lure, any splashing action accidentally caused by the protruding tails would be of a radically different nature than the splashing caused by the present invention. Similar appendages, if used in combination with the present invention, would still allow the resulting fishing lure to operate according to the theory of operation described herein. It is therefore stipulated that soft bodied embodiments of the present invention may incorporate such "flipper like" features, in such cases that they do not interfere with the claims of the present invention.

Finally, U.S. Pat. No. 7,234,267 Jun. 26, 2007 to Konstant reveals a modified Texas rigged worm incorporating a cone at the nose. However, in this case, the cone faces backwards, and is used purely as the "head" of the worm, and as a means of rendering the fishing lure more nearly weedless by inhibiting snagging of weeds by deflecting such weeds away from the soft bodied nose of the fishing lure. It is particularly likely to be a sinking fishing lure, and would not generate any significant surface water splashing were it to be given positive buoyancy.

Therefore fishing lures heretofore known suffer from a number of disadvantages:
a) Very few are designed specifically to be weedless surface floating fishing lures, adapted to being retrieved over the top of weeds, logs, and other floating debris where large fish tend to hide.
b) Very few surface floating weedless fishing lures are capable of generating splashes, sounds, or water vibrations of sufficient strength to attract the attention of fish hiding at a distance or hiding out of sight underneath cover where the hiding fish cannot directly see the fishing lure lying on the water surface.
c) Various existing fishing lures that are designed to splash or attract attention on the surface of the water tend to not have the benefit of natural appearing soft bodied prey. Furthermore many tend to generate sounds or vibrations by means that do not keep the fishing lure rigorously on the surface. A fishing lure that dives below the surface, even by several inches, will tend to snag debris, even if the fishing lure's hooks are theoretically rigged to be weedless.

OBJECTS AND ADVANTAGES

Accordingly, besides the objects and advantages of the Spitting Weedless Surface Fishing Lure described in my above patent, several objects and advantages of the present invention are:
a) to provide a lightweight floating fishing lure that can be tugged over the top of floating lily pads and other debris, while floating on the top surface of the water;
b) to provide a fishing lure that is sufficiently weedless so that the hook will not set when the fishing lure is pulled gently over the top of floating logs and branches;
c) to cause the fishing lure to generate splashes on the water surface of sufficient intensity to attract the attention of large fish hiding underneath obstacles, while those fish remain hidden from being able to see the fishing lure being retrieved;
d) to sometimes provide a soft-bodied natural appearing fishing lure having the appearance and natural body motions typical of natural prey of fishes;
e) to provide a fishing lure that generates other sensory appeals that might attract fish to strike at them, subsequent to initially attracting their attention with the splashing of surface water
f) to do the above, with a fishing lure that is easy to rig, cast, and retrieve;
Further Objects and Advantages are:
a) to provide a combination of means likely to attract fish;
b) to enable weedless fishing in weed and log rich environments that are typical hiding place for large fish;
c) to attract hidden fish initially with a surface splash of water, and to subsequently attract them to strike with conventional fish attractant means.

Still further objects and advantages will become apparent from a consideration of the ensuing description and drawings.

SUMMARY

In accordance with the present invention, a surface floating fishing lure including a forwards facing concave surface designed to scoop, redirect, and "spit" water across the surface of the water when the fishing lure is tugged sharply. The resulting surface disturbance may initially attract fish hiding under cover of lily pads and other floating weeds or debris, where they might not otherwise sense the presence of the fishing lure. This fishing lure shall include at least one fish hook rigged to be weedless, containing a flexible member deflecting weeds and debris away from each barbed point, a forwards facing concaved surface oriented in a manner predetermined to be suitable to redirect and splash a spray of water across the water surface, a floating body, a fish line connecting means at the forwards end of said fishing lure. It may further include at least a portion of said floating body taking the form of a flexible soft polymer plastic body in a shape resembling natural fish prey such as worms, frogs, minnows, centipedes, and etc.

DRAWINGS

Figures

FIG. #
1. Isometric view of worm-like embodiment
2. Isometric view of shad-like embodiment
3. Isometric view of frog-like embodiment 4. Isometric view of centipede-like embodiment
5. Lengthwise sectional view of worm-like embodiment
6. Side view of standard offset fish hook
7. Side view of stretched offset fish hook
8. Side view of foam floatation fish hook
9. Isometric rear view of double fish hook
10-14 Lengthwise sectional views of worm-like bodies
15. Lengthwise sectional view of flexing hook generic body
16. Lengthwise sectional view of flexing generic body
17. Lengthwise sectional view of hook based generic body

REFERENCE NUMERALS

First Reference

Figure 2:
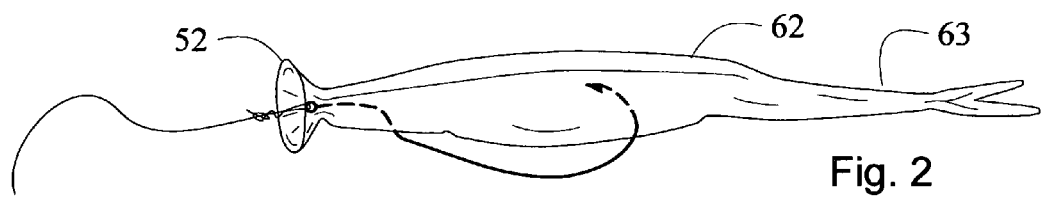
Figure 3:
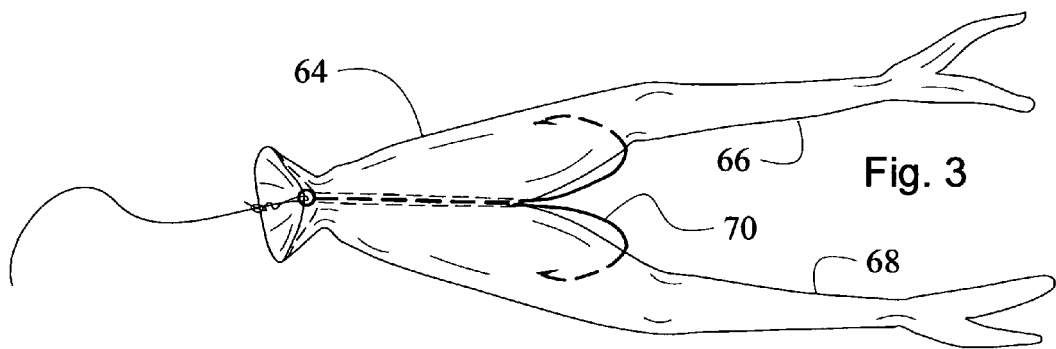
Figure 4:
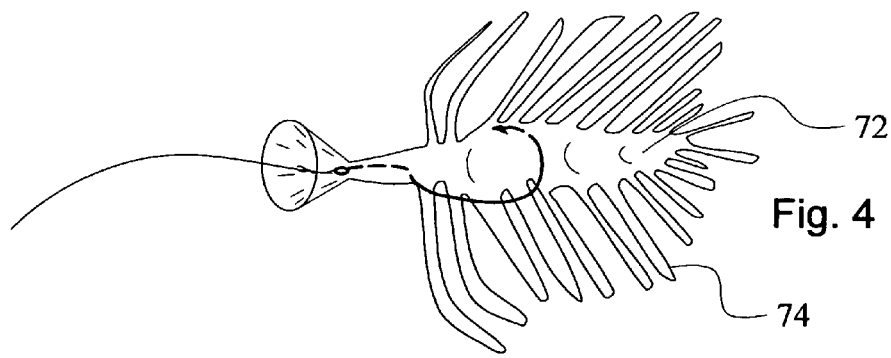
Figure 5:
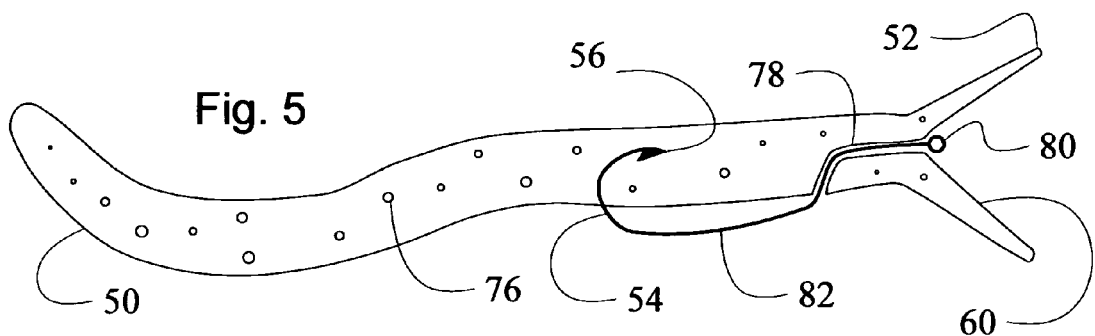
Figure 6:
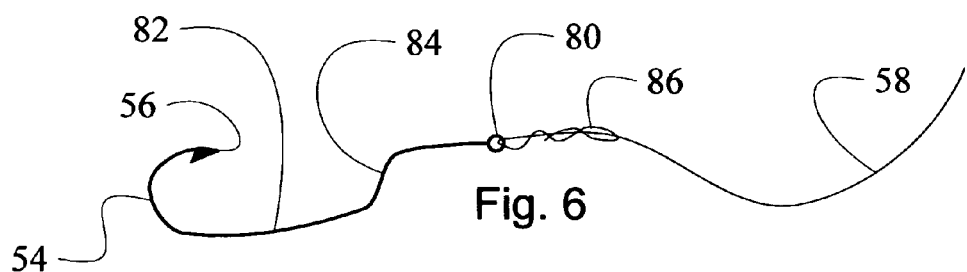
Figure 8:
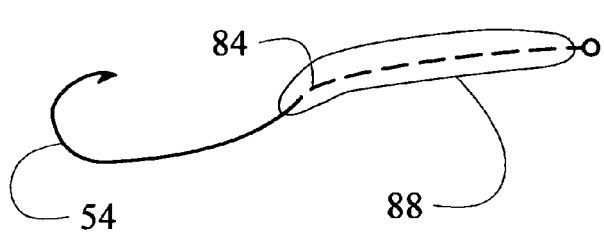
Figure 10:
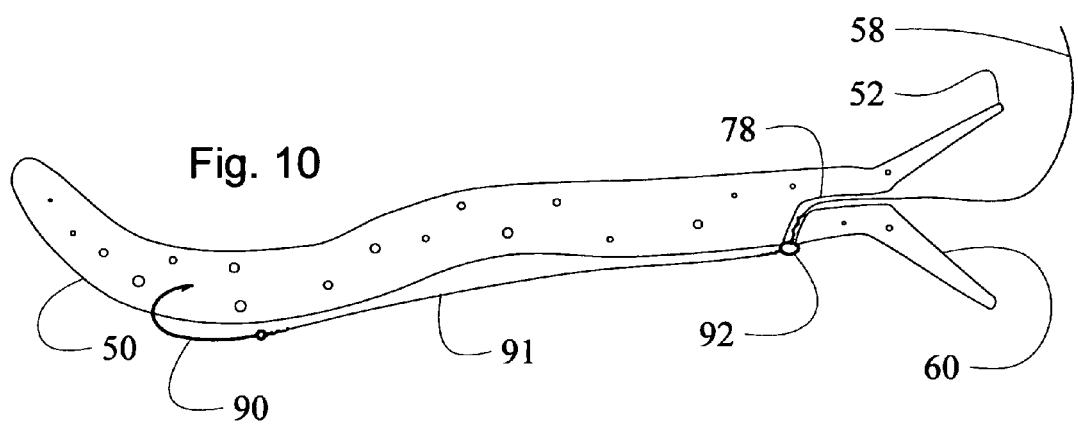
Figure 11:
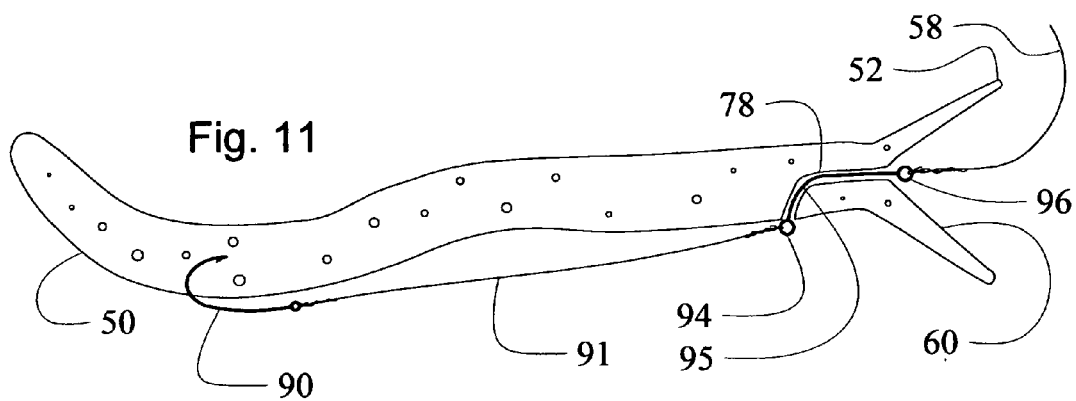
Figure 12:
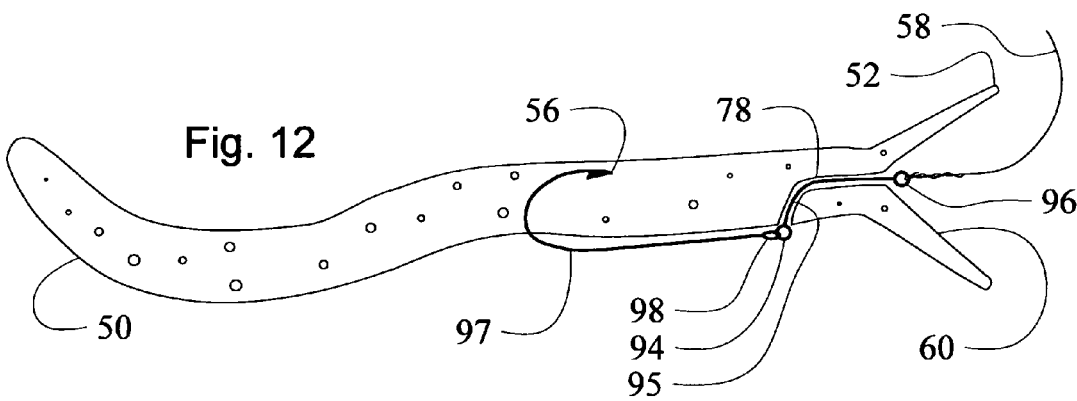
Figure 13:
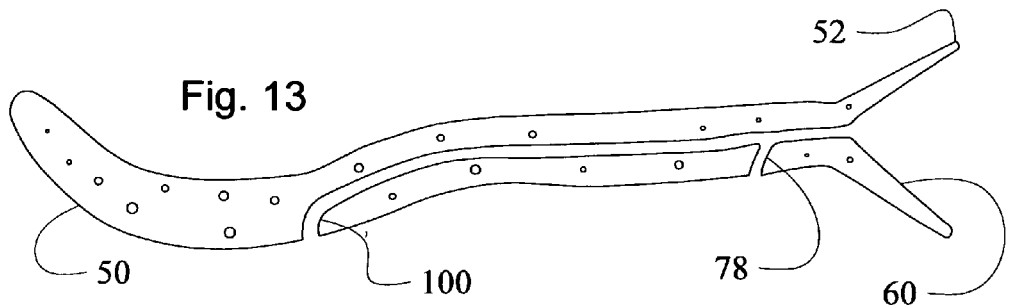
Figure 14:
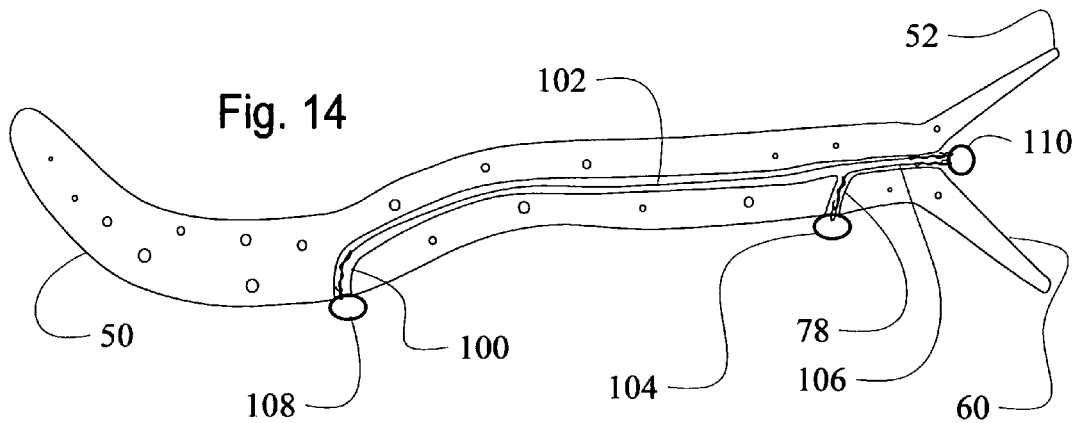
Figure 15:
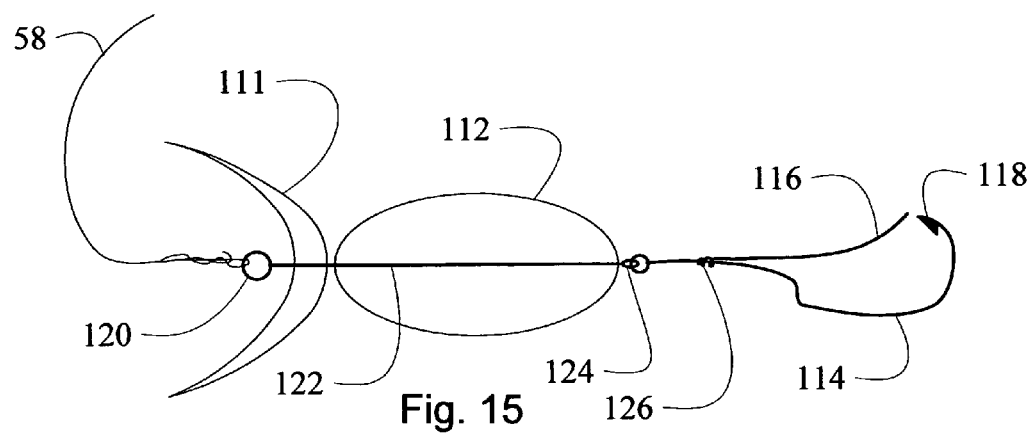

FIG. 1
50 Worm-like body
52 Forwards facing cone
54 Offset Fish hook
56 Fish hook barb
58 Fish line
60 Concave hollow
  FIG. 2
62 Shad-like body
63 Shad's tail
  FIG. 3
64 Frog-like body
66 Right leg
68 Left leg
70 Double Hook
  FIG. 4
72 Centipede-like body
74 Appendages
  FIG. 5
76 Vacuoles
78 Bore hole
80 Fish hook loop
82 Fish hook shaft
  FIG. 6
84 Offset curve
86 Fish line fastener
  FIG. 8
88 Floatation sleeve
  FIG. 10
90 Tail fish hook
91 Exterior leader
92 Stopper ring
  FIG. 11
94 Rigging loop
95 Short leader
96 Fish line loop
  FIG. 12
97 Straight fish hook
98 Fish hook eye
  FIG. 13
100 Rear bore hole
  FIG. 14
102 Rear leader
104 Front stopper ring
106 Front leader
108 Rear stopper ring
110 Forwards leader ring
  FIG. 15
111 Concaved water deflector
112 Floating body
114 Fish hook
116 Flexible weedless means
118 Barb of fish hook
120 Fish lure connector
122 Tensile connector string
124 Flexible tensile connector
125 Fish hook shaft
126 Deflector connection means

DETAILED DESCRIPTION

General Overview

FIG. 1-4 show four soft bodied embodiments of this fishing lure. Each of these four embodiments take the form of flexible polymer plastic soft bodied fishing bait rigged in a manner similar to a Texas rigged bait, but rigged without sinkers, and each provided with a floating body. Each embodiment includes of a forwards facing cone (52), an offset fish hook (54) or (70), and a soft polymer body resembling some natural fish prey, such as a worm-like body (50), a shad-like body (62), a frog-like body (64) or a centipede-like body (72). Each of these 4 bodies (50), (62), (64), and (72) constitutes a floating body given sufficient positive buoyancy for the fishing lure to be caused to remain floating on the surface during all normal modes of retrieval of the fish line.

In each case, the forwards facing cone (52) is oriented in a forwards direction whereby tugging the fishing lure across the surface of the water will result in a vigorous "spitting" of water across the surface of the water. While forwards facing cone (52) is shown as a true forwards facing hollow cone, it is to be understood that any forwards facing concave surface, straddling the waterline, shaped in a predetermined manner to throw water vigorously across the surface of the water when the fishing lure is rapidly retrieved, will serve as an equivalent to the forwards facing cone (52). And any forwards facing concave surface mentioned later in these specifications may also take the form of a forwards facing cone (52) as illustrated in the present embodiments.

In each case the fish hook (54) or (70) is rendered weedless by a modified Texas rigging wherein the fish hook barb (56) is buried securely in the soft polymer plastic body (50), (62), (64), or (72), allowing the fishing lure to be pulled over the top of weeds, lily pads, logs, and other floating surface debris.

In each case the soft polymer plastic body (50), (62), (64), or (72) is fabricated so as to be lighter than water, so that it rigorously floats, and does not sink below the surface during normal retrieval of the fishing lure. In particular, it is desirable to adjust the buoyancy of the fishing lure such that the forwards facing cone (52), or equivalent forwards facing concave surface, may float straddling the waterline, thereby encouraging spitting of water across the surface when the fishing lure is retrieved or tugged forwards rapidly. This "spitting action" of water across the surface is a salient feature of the theory of operation of all embodiments of the present invention.

FIG. 1 Embodiment A

FIG. 1 illustrates Embodiment "A", which is a "spitting worm". The worm-like body (50) is both formulated and configured in a manner similar conventional soft polymer plastic fishing worms, but provided with an integrally attached forwards facing cone (52) at the head end of the worm-like body (50). Of course, as in any embodiment, other equivalent forwards facing concave surfaces straddling the waterline may be used in place of forwards facing cone (52). Additionally, the worm-like body (50), and the soft flexible bodies of all other soft bodied embodiments, shall be specified to have a net specific gravity sufficiently below one, whereby the resulting fishing lure will both float on the surface, and resist easily being pulled under the surface as the fishing lure is tugged through the water.

Note that the fish hook (50) has a fish hook barb (56) buried in the soft plastic of the of the worm-like body (56) whereby the fishing lure may be rendered essentially weedless. This method of rigging the worm-like body (56) with the fish hook (54) is essentially a modified "Texas rigging", except that there is no sinker added to cause the worm-like body (50) to sink, in the weighted manner common when Texas rigging a worm. Most true Texas rigged baits are designed to operate below the water surface, often on or near the bottom. All embodiments of the present invention are to be rigged without weights, and require strong positive floatation.

In such "modified Texas rigging", the positive floatation wormlike body (50) has the offset fish hook (54) threaded through the head of the worm-like body (50), protruding through the concave hollow (60) approximately in the center of the forwards facing cone (52), where a fish line (58) may be secured to the fish hook (54) in a conventional manner.

While not illustrated, it is also possible to form cavities, pockets, or slits inside a soft polymer bait body such as worm-like body (50) where the fish hook barb (56) may more easily penetrate through the surface of worm-like body (50). This practice too is well known in the industry and covered by existing patents such as U.S. Pat. No. 4,873,783 and U.S. Pat. No. 4,196,884.

It is also possible to provide a fin or protrusion on such a body, and embed a fish hook barb (56) inside of such a fin or protrusion (not illustrated) such that the fish hook barb (56) is both close to the surface of worm-like body (50) and in a position to more readily engage the lip of a striking fish. This method of rigging appears to be known in the prior art.

A rigging method that is apparently not covered by prior art is to line a longitudinal slit with a smooth tough sheath (not illustrated), such that fish hook barb (56) may slide in and out of such a longitudinal slit (not illustrated) in worm-like body (50) with the need to penetrate little or none of the polymer plastic of worm-like body (50) when a fish strikes. This novel rigging method eliminates the need to repeatedly puncture the soft worm-like body (50), or other soft bodied embodiments mentioned in these specifications. The longitudinal slit allows non-puncture "hiding" of the fish hook barb (56) inside of the worm-like body (50) and the smooth tough sheath (not illustrated) may be used (but is not absolutely required) as a means to prevent accidental embedment of fish hook barb (56) in the walls of said longitudinal slit.

In operation, the fishing lure of Embodiment "A", as well as other embodiments, floats on the surface, and the forwards facing cone (52) propels a small stream of water into the air, to splash on the surface each time the fish line (58) is tugged vigorously. Other equivalent varieties of forwards facing concaved surfaces may substitute for (52), provided they are sufficiently concave to generate ram pressure in the water, and shaped in a predetermined manner suitable for propelling a stream or splash of water into the air. For instance, more complex concaved surfaces may channel such water into multiple streams.

The light weight and positive buoyancy of the fishing lure encourage it to remain on the surface as it is pulled over the top of floating debris and weeds. The "spitting water" produced by forwards motion of the forwards facing cone (52) tends to attract fish by sound, surface disturbance, and pressure waves created when the "spitting water" strikes the surface of the water.

The natural appearance and flexible motions of the worm-like body (50) subsequently encourage fish to bite the fishing lure largely by visual appeal, particularly when it is moved over the surface in a skillful series of jerking motions. This theory of operation holds true for all other soft bodied embodiments (B, C, & D) of this invention as well. A worm-like body (50), or other long flexible embodiments, may exhibit snake-like sinusoidal oscillations in some configurations of the fishing lure, as the result of oscillating turbulences (trailing vortices) in the water set up by the motion forwards facing cone (52). While this is not the primary intent of the forwards facing cone (52), it may still be a desirable feature in some embodiments, particularly if rigged so as to remain flexible just to the rear of the forwards facing cone (52). It is quite possible to choose the shape of the forwards facing cone (52) and the level of flexibility of the fishing lure immediately behind the forwards facing cone (52) to accentuate such snake like sinusoidal oscillations. This may be done by choosing each of these two variants, as well as the length and shape of the body, to maximize the power of trailing vortices to either side of worm-like body (50) or other equivalent soft flexible polymer plastic bodies.

FIG. 2 Embodiment "B"

FIG. 2 represents a spitting fishing lure given a soft shad-like body (62), in place of the worm-like body (50) of FIG. 1. It operates in a similar manner in every respect, with the exception of not exhibiting the long flexible body of a worm. If the shad's tail (63) is somewhat offset from the midline of the shad-like body (62), it can provoke additional motion through the water, perhaps even encouraging the fishing lure to follow a spiral path through the water. Of course, any embodiment encouraging spinning of a fishing lure should normally be connected to fish line (58) my means of a common swivel connector to prevent twisting of fish line (58), as is well known to those experienced in fishing. Such a swivel connector can also be included as a permanent part of the fishing lure at the point of attachment of fishing line (58), as is done with some spinners and other spiraling motion conventional fishing lures. This is done to inhibit twisting and snarling of fish line (58) during retrieval of the fishing lure.

FIG. 3 Embodiment "C"

FIG. 3 represents a spitting fishing lure given a soft frog-like body (64). In this illustration, the frog-like body (64) is represented by only the hindquarters of a frog, securely attached directly behind the forwards facing cone (52). While a more complete frog body may be represented, the current theory of operation indicates that the flexing legs of a frog represents the primary visual stimulus immediately encouraging striking of the fishing lure by a fish.

In the illustrated case a double hook (70) may take the place of the offset fish hook (54) in FIG. 1. In this case, the fish hook barbs of double hook (70) are buried deeply into the right leg (66) and the left leg (68) of the frog-like body (64) in another modified style of Texas rigging. Of course, the frog-like body (64) may also be rigged in a simpler manner with a single barb fish hook as is the case in most of the other embodiments illustrated.

The angles and offsets of right leg (66) and left leg (68) relative to the frog-like body (64), as well as flexibility of the two legs, may be varied to provide additional body action as the fishing lure is propelled through the water. Possible body action might include spiraling of the frog-like body (64), or heavy flexing of right leg (66) and left leg (68) as tension on the fish line (58) is increased or decreased. These motions may be encouraged both by the shape and flexibility of the legs, and the thickness and orientation of the material of which they are fabricated at their points of bending.

As the angles of attachment of legs are varied, the rear portion of the resulting fishing lure may eventually approach the theory of operation of the double tailed worm fishing lure of Strickland in U.S. Pat. No. 4,619,069—at least insofar as it relates to the flipper-like motion of the two legs when they are set at a great angle from the center of the fishing lure. But, of course, this is in addition to a salient feature of the present invention, namely the forwards facing cone (52) or other equivalent forwards facing concave surface which turns it into a "spitting fishing lure".

FIG. 4 Embodiment "D"

FIG. 4 represents a spitting fishing lure given a soft centipede-like body (72) having multiple soft flexible appendages (74) laid out at a substantial angle to the midline of the floating body, and formulated so that the appendages (74) both freely flex and freely float upon the surface of the water. The theory of operation of this embodiment is that the flexible appendages floating on the surface shall serve to generate mild disturbance on the surface of the water upon very light movements of the fishing line, simulating mild movement of living prey, after a vigorous spitting jerk shall initially catch the fish's attention. Alternating action of violent tugs producing "spitting" action and gentle tugs creating subtle surface movement of appendages may be particularly useful in both initially attracting and then subsequently encouraging striking by fish as such fish move from auditory sensing of prey into visual hunting mode.

FIG. 5-9 General Considerations

All Soft-Bodied Embodiments

FIG. 5 represents a sectional view of the worm-like body (50) of FIG. 1, but is also representative of all 4 of the previous embodiments.

The forwards facing cone (52) is shown as cast as a continuous piece of the worm-like body (50), of the same material as the worm-like body (50). Early working prototypes of all embodiments were fabricated and tested, however, using common elastomeric suction cups in place of the forwards facing cone (80). These suction cups (not illustrated) were made adherent to the worm-like body by either a flexible adhesive, or by casting the rearwards knob of the suction cup (not illustrated) into the soft flexible polymer plastic of the worm-like body (50). These ordinary elastomeric suction cups were quite successful at attracting fish, and greatly increased fish catch compared to the same fishing lures used without the forwards facing suction cups.

The successful use of the common suction cup as a head for the fishing lure indicates that it is neither necessary for the forwards facing cone (80) to be integrally cast as part of the worm-like body (50), nor that the forwards facing cone (80) literally take the form of a funnel-like cone. It is sufficient that a concave hollow (60) be formed at the head of the worm-like body (50) having a scoop-like shape predetermined to be suitable for redirecting and propelling a spray of water across the surface of the water when the fishing lure is suddenly jerked in the forwards direction. It should also be noted that more complex concave surfaces may be employed. For instance, a true forwards facing funnel possessing one or more curved outlet spouts may also create ram pressure ahead of it and redirect one or more streams of water into the air, as can many other conventional forwards facing concaved surfaces.

Specifically excluded from the present invention, however, is the use of "spoons" at the front of the fishing lure, similar to those that cause a diving action in the classic "popper" style of floating fishing lure. It is specified that the shape of any such forwards facing concave surfaces, such as forwards facing cone (80), shall be chosen such that any resulting net motion of water does not significantly propel the fishing lure in a downwards direction. This will usually entail a forwards facing concave surface having a predetermined shape that will produce a net downwards thrust of water approximately equal to the net upwards thrust of water required to create the "spitting water effect" that is a salient feature of all embodiments of this fishing lure. Concaved geometric surfaces having radial symmetry approximately about the longitudinal centerline of the fishing lure are particularly likely to meet this requirement of equal thrust upwards and downwards in all orientations of the fishing lure. Forwards facing cones (80) and suction cup-like shapes fall in this category.

Alternately, it is also possible to make a floating body, such as worm-like body (50) with such a degree of excess floatation that any thrust or imbalance of forces created by the water propelled upwards into the air shall not cause the fishing lure to dive below the surface. This degree of excess floatation is difficult, but not impossible, to obtain in soft bodied lures, explaining the simple geometric forms having radial symmetry employed in most of the tested prototypes. Suction cup-like shapes (not illustrated, but as thoroughly tested) and shapes similar to forwards facing cone (80), as illustrated, both serve this "balanced thrust" purpose admirably.

Whether or not the forwards facing cone (80) is integrally cast with the worm-like body (50), the offset fish hook (54) may be threaded through the head of the worm in the manner common to Texas rigged worms, such that the offset curve (84) of the offset fish hook (54) may be threaded through a borehole (78) extending through the head end of the worm-like body (50) such that the fish hook loop (80) protrudes approximately into the center of the concave hollow (60).

Note that a bore hole (84) is illustrated as extending from approximately the center of the concave hollow (60), through the head and back out the side of the worm-like body (50). When the fishing lure is sold disassembled in kit form, it is theoretically possible for the user to create bore hole (84) through the head of the worm-like body (50) using the fish hook barb (56) to puncture the flexible polymer of the worm-like body (50) in the manner common when fishermen are field rigging Texas rigged worms. However, experience has taught us that it is easier for the average fisherman to rig or re-rig the offset fish hook (56) if a bore hole (78) is either pre-formed along at the time of the casting of the worm-like body (50), or subsequently drilled or punctured during the time of manufacture to make rigging easier for the end user. It is to be understood that reference to a borehole, such as borehole (78) may also refer to such a borehole as punctured by the end user, or even to the completely filled borehole resulting from casting a fish hook, leader, or other similar shaft-like object into the body of the fishing lure, such as worm-like body (50).

As normally Texas rigged, the fish hook shaft (82) of offset fish hook (54) may protrude outside of the worm-like body (50) for some predetermined distance before re-entering the worm-like body such that the fish hook barb ends up buried inside the worm-like body (50). It should normally be so threaded without causing bunching up of said worm-like body. This is done in the manner customary to Texas rigged worms—namely, by stretching the elastic worm-like body (50) slightly in the region of the fish hook shaft (82) such that, after embedding the fish hook barb (56), the worm-like body (50) will snap back to an approximately straight configuration in the region of the offset fish hook (54).

In operation, a strong strike by a fish has a tendency to push upon the fish hook shaft (82), allowing the fish hook barb (56) to protrude from the worm-like body (50) and into the lip of the striking fish. Therefore it is quite normal for the user to have to reset the fish hook barb (56) into the worm-like body (50) after catching each fish. Since the lips of a fish can only exert such a force upon fish hook shaft (82) in a single plane, there is some advantage, with appropriate shaped fish lure bodies, such as frog-like body (64), in FIG. 3, to the use of a double hook (70), or other multiple or more complex hook. These more complex hooks allow a fish hook barb (56) to be pushed into the lip of a striking fish regardless of the plane of forces exerted by the jaws of the striking fish. Any such conventional device to allow setting of a hook regardless of the plane of the biting forces should be considered to be included as part of the present invention.

The worm-like body (50), as well as the soft bodies provided in all other embodiments, may be fabricated from elastomeric polymers having a net specific gravity less than one (lighter than water). This has proved successful in prototypes. If, however, a slightly heavier polymer is employed, or if the offset fish hook (54) or any other inclusions in the fishing lure increase its net specific gravity, then additional floatation means may be needed. One such additional flotation means is illustrated as floating hollow beads, or simply bubbles blown into the elastomeric polymer, represented by the vacuoles (76).

Various techniques can create flexible polymers having low specific gravity. Among them are: aeration, evaporation of an entrained solvent, inclusion of lightweight hollow beads, or the inclusion of other small objects of low specific gravity. While the vacuoles (76) are illustrated as simple bubbles, they are also to include extraneous light weight inclusions, such as hollow beads, or even bits of cork. Mixing and casting must occur with sufficient rapidity to discourage their floating to the top during casting of the fishing lure body, such as worm-like body (50).

FIG. 6 illustrates offset fish hook (54) separated from the worm-like body (50), and also representing the manner of its being secured to fish line (58). In the illustration, fish line fastener (86) is represented as a simple fisherman's knot in the fish line (58) securing the fish line (58) to the fish hook loop (80) in the customary direct-tied fashion. If, however, the fishing lure is configured in any manner that might hydrodynamically encourage spinning, fish line fastener (86) may then represent a common swivel connector or swivel and snap fastener (not illustrated).

Note that offset fish hook (54) is illustrated as having an offset curve (84) to more nearly conform to the shape of the worm-like body (50), FIG. 5, when properly Texas rigged. Other styles and sizes of fish hooks have been used to good effect as well, but sometimes have the effect of distorting the finished shape of the worm-like body (50) from its natural shape. This sometimes has the adverse effect of causing diving of the fishing lure below the surface, whereby weed snagging becomes more likely. A fishing lure that rigorously remains on the surface has the advantage of being able to be sharply jerked into the air by upward pull on the fishing line so as to fly or jump over the top of logs or other nasty floating debris. Therefore, experience has taught us that rigging methods that tend to distort the orientation of forwards facing cone (52) relative to worm-like body (50) should be avoided, giving some advantage to the use of offset fish hooks, such as offset fish hook (50), when Texas rigging this embodiment.

Figure 7:
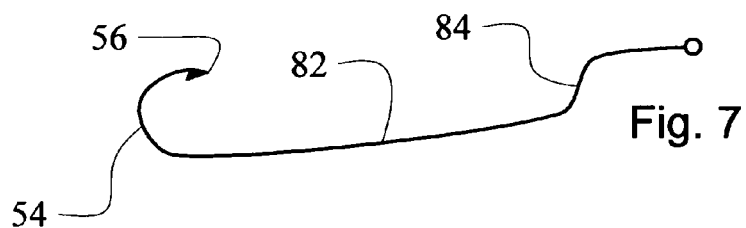

FIG. 7 illustrates an almost identical offset fish hook (54), differing only in the length of fish hook shaft (82). This illustrates the fact that the finished fishing lure may be sold in kit form, with one or more different sizes/shapes of fish hooks, such as offset fish hook (54), allowing different styles and positions of rigging by the final user. In this particular case, FIG. 7 illustrates that the use of a offset fish hook (54) having a longer fish hook shaft (82) than the one originally installed in FIG. 5, will allow the fish hook barb (56) to land in a different portion of the worm-like body (50), in FIG. 5, whereby the useful life of the fishing lure may be extended by moving the position of penetration of the fish hook barb (56) in the worm-like body (50). Use of alternate length fishing hooks by the end user prevents repeated puncturing of the wormlike body (50) at the same place from resulting in eventually cutting wormlike body (50) into two pieces.

FIG. 8 illustrates an offset fish hook (54) being provided a flotation sleeve (88) of a buoyant material such as a closed cell foam plastic or of common cork. This provides the possibility of the inherently heavy offset fish hook (54) itself having neutral or positive buoyancy. This solution is particularly desirable when particularly large or heavy fish hooks are to be employed.

Figure 9:
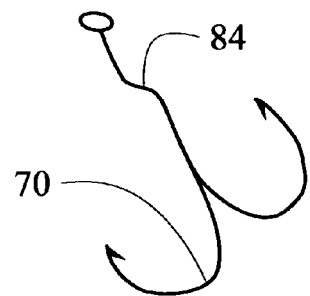

FIG. 9 illustrates a rear isometric view of the double hook (70), also seen in FIG. 3 and particularly useful in Texas rigging a frog-like body (64), as illustrated in FIG. 3. Note (in FIG. 9) that the double hook (70) may be equipped with an offset curve (84) to facilitate proper Texas rigging. This specially bent fish hook may not be presently commercially available, since Texas rigging of double hooks may not presently be a common practice. Note that it is also possible to rig frog-like body (64) of FIG. 3 with two separate copies of a single offset fish hook, such as offset fishhook (54) of FIG. 5.

FIG. 10-FIG. 14 Alternative Rigging Methods

Overview: FIG. 10-FIG. 14 illustrate alternative methods of rigging this fishing lure. These alternatives are particularly important, since the most desirable method of rigging the hook in a soft bodied fishing lure varies with the size and species of the fish, as well as with the experience and fishing method of the angler. In some cases, fishing lures such as this may be sold in "kit form", including fish hooks, leaders, etc. required for rigging the fishing lure in more than one manner.

It should be noted that, particularly when sold in kit form, this fishing lure may end up being rigged by the angler in a manner other than originally intended. In particular, some anglers may not set the barbed end of the hook into the soft polymer body of the fishing lure (Texas rigged style) when used at times and during conditions when the weedless feature is less critical. In such conditions, the ordinary hooks illustrated might even be replaced with one or more treble hooks, or with other conventional weedless hooks having a wire guard extending from the hook shaft to the barbed point of the hook (as in FIG. 15-17). And, in some cases, the fishing lure may be manufactured, already so equipped.

Since, in its most common usage, this fishing lure requires weedless features to avoid weeds, logs, and debris, it would ordinarily be sold with hooks to be rendered weedless either by conventional weed shields extending from shaft to barbed tip of the fish hook(s), or with the barbed tip of the fish hook(s) intended to be rigged in a weedless fashion by embedding in the soft polymer body of the fishing lure. Kits may be sold with a variety of hooks, weedless hooks, multi-pronged hooks, leaders, snap fasteners, swivels, or other common fishing lure hardware.

FIG. 10 illustrates a sectional view of a worm-like body, as in embodiment "A", but is applicable as well to all other embodiments. In particular, it illustrates clearly that borehole (78) consists of a hole extending from approximately the center of the concave hollow (60), through the head of the worm-like body (50) (head not separately labeled), and back out through one side of the worm-like body (50). The aft exit point of borehole (78) is not separately labeled, but is located adjacent to stopper ring (92). The borehole (78) illustrated is of the same length and shape required for a common offset fishing hook (54), as in FIG. 5. But, in FIG. 10, the borehole is illustrated as rigged in a different manner, which may generically be referred to as "soft rigging".

This particular "soft rigging" consists of using fishing line (58), or an equivalent leader threaded through borehole (78) in place of the offset fish hook (54) of FIG. 5. Stopper ring (92) may be secured by any conventional means to fish line (58). In practice, stopper ring (92) may represent a literal ring, bead, snap fastener or any other convenient object sufficiently large to resist being pulled into and through the aft exit point of borehole (78) during the retrieval of the fishing lure.

In FIG. 10, a conventional exterior leader (91) may extend from stopper ring (92) to tail fish hook (90), being secured at each end by any conventional method employed for the securing of fish line or leaders. Note that a variable and perhaps adjustable length of exterior leader (91) allows emplacement of tail fish hook (90) at any arbitrary point along the worm-like body (50), or other equivalent flexible bodies illustrated in other embodiments. It is also easy to rig multiple exterior leaders (91) and multiple tail fish hooks (90) such that the tail fish hooks (90) land at various points along the length of worm-like body (50)—though such multiple riggings are not illustrated.

It should be noted that, particularly when sold in kit form, that borehole (78) should preferably be fabricated with a relatively large diameter and sufficiently smooth inside walls to facilitate easy threading of fish line (58) or an equivalent leader, or easy insertion of an offset fish hook (54), with such rigging illustrated in FIG. 5. To this end, kit form fishing lures, in particular, may be provided with a smooth walled insert or sleeve (not separately illustrated) placed inside of borehole (78) or any other boreholes, such as rear borehole (100) in FIG. 14. This facilitates easy rigging, particularly the threading of flexible fish line or leaders, but is not absolutely required.

FIG. 11 also illustrates a sectional view of a worm-like body, as in embodiment "A", but is applicable as well to all other embodiments. It is very similar to the structure illustrated in FIG. 10, except for the fashion of rigging inside of and at either end of borehole (78). In FIG. 11, it will be noticed that a short leader (95) extends through borehole (78), terminating at the front end of the fishing lure with fish line loop (96), which is typically just a wire loop, and terminating at the point of exit from borehole (78) with rigging loop (96). Note that, in this variation, short leader (95) may be permanently rigged and emplaced through borehole (78), perhaps even glued or cast into the polymer of the worm-like body (50) to be held securely in place. When such a short leader (95) is permanently secured inside said borehole (78), it makes the fishing lure easier to rig than conventional soft bait. If short leader (95) is cast in place inside the soft polymer plastic of worm-like body (50), then borehole (78) degenerates into a short leader (95) being emplaced at the time of casting, wherein the borehole (78) merely exist as the soft polymer plastic being intimately formed around short leader (95). This also may apply to the more complex leader system illustrated in FIG. 14.

In this embodiment, in FIG. 10, short leader (95) may be fabricated as either a conventional flexible leader, or perhaps even a rigid piece of wire having fishing line loop (96) at one end and rigging loop (94) at the other end.

Rigging loop (94), in this variation, may then take the form of a permanent fixture of the fishing lure, but allowing easy changing and substitution of the downstream rigging, such as exterior leader (91) and tail fish hook (90). Particularly when sold as a kit form, it may be convenient to make rigging loop (94) to include some convenient conventional snap fastener (not separately illustrated) whereby rigging may be conveniently and quickly altered without the tying of knots. This is particularly useful to allow for different length hooks or leaders to be used at different times to prevent repeated punctures in the same region of worm-like body (50) resulting in tearing worm-like body (50) into two pieces.

FIG. 12 also illustrates a sectional view of a worm-like body, as in embodiment "A", but is applicable as well to all other embodiments. It varies from FIG. 11 in that the combination of exterior leader (91) and tail fish hook (90) of FIG. 11 is substituted with straight fish hook (97) directly but flexibly linked to rigging loop (94). Note, that if rigging loop (94) includes some conventional snap fastener (not separately illustrated), then the rigging system of FIG. 12 and that of FIG. 11 are freely interchangeable in the field by the angler, perhaps without the need for tying any knots. It should also be noted that the use of said conventional snap fastener allows easy replacement of straight fish hook (97) with any other fish hook or leader of different size or shape. This serves the additional useful purpose of causing fish hook barb (56) to land at different points inside the worm-like body (50), as fish hook or leader length changes, whereby the puncture damage and structural weakness caused by repeated usage and penetration of the soft worm-like body by the fish hook barb (56) may be somewhat mitigated.

For the above reasons, short leader (95) being securely fastened inside of borehole (78), so as not to be liable to be jerked out of borehole (78), and having a snap fastener taking the place of rigging loop (94), is a particularly versatile variation suitable for any of the soft bodied fishing lures described herein.

While not illustrated separately, in the frog-like body (64) of FIG. 3, it is also possible to utilize a short leader (95) that branched into two separate leaders, terminating downstream with two individual rigging loops (94), one for each of the right leg (66) and left leg (68). In that case, two separate straight fish hooks (97) may be employed, as in FIG. 12, but rigging one each into right leg (66) and left leg (68) of FIG. 3. Alternately, a pair of exterior leaders (91) and tail fish hooks (91) may be used (as in FIG. 11) with tail fish hooks (90) emplaced closer to the tail ends of right leg (66) and left leg (68) of FIG. 3. This is particularly convenient if a conventional snap fastener is provided in place of each of the two rigging loops (94), one on each of right leg (66) and left leg (68) respectively.

FIG. 13 also illustrates a sectional view of a worm-like body (50), as in embodiment "A", but is applicable as well to all other embodiments. It illustrates the possibility of providing within worm-like body (50), or other equivalent floating bodies, one or more rear bore hole(s) (100), extending from borehole (78) to exit at point(s) further downstream on worm-like body (50). Particularly when sold in kit form, the one or more rear bore hole(s) (100) obviously allow for more versatile rigging, and one or more hooks emplaced at one or more extra points along the worm-like body (50) or other equivalent soft polymer bodies shown in other embodiments.

FIG. 13, as illustrated without rigging, demonstrates the "bare fishing bait" that might typically be sold as part of a kit including multiple forms of hooks, leaders, and other conventional bait rigging. In cases where the user must do the rigging, it may be useful to provide a sleeve insert (not separately illustrated) whereby borehole (78) and rear borehole(s) (100) may be provided an opening that remains always open and easy to rig. Such a sleeve insert may resemble a flexible soda straw or thin walled hose having a smooth and slippery inner wall. Its main purpose would be ensure that the boreholes (78) and (100) shall remain open and not collapse so as to facilitate threading of fish line or leaders through the respective two boreholes (78) and (100). In the absence of such sleeve inserts, boreholes in soft flexible polymer plastic fishing lures tend to squeeze shut and make threading of flexible fish line or leaders more difficult.

FIG. 14 illustrates a variation of FIG. 13, wherein two leaders, front leader (106) and rear leader (102) are both secured to the same forwards leader ring (110), which is in turn secured to a fish line or another leader (neither illustrated) by conventional means.

Since rear leader (102) presumably extends for a sizeable portion of the length of worm-like body (50) there is some advantage, in this variation, to making one or both of front leader (106) and rear leader (102) of some flexible high strength tensile material (such as is conventionally used in flexible leaders). Front leader (106) terminates downstream at front ring stopper ring (104) and rear leader (104) terminates downstream at rear stopper ring (108). If these two leaders (102) and (106) are not secured by adhesive or secured by being cast securely in place inside of borehole (78) and rear borehole (100) respectively, than the two stopper rings (104) and (108) must be of sufficient diameter to prevent being pulled into and through boreholes (78) and (100) respectively.

In any case, for ease of variation in rigging, it may be desirable to cause both stopper rings (104) and (108) as well as any additional such stopper rings included in the length of worm-like body (50), to include conventional snap fasteners to allow fast and convenient alteration of rigging. Such snap fasteners are not illustrated separately, but are commonly used in rigging fishing lures.

It will be noted that the rigging shown in FIG. 14 may be secured in place firmly at time of manufacture, providing two or more fastening points to allow hooks and/or leaders to be secured at multiple points along the length of worm-like body (50) as desired by the angler. This variation may be particularly desirable when used with larger fishing lures, when leaders such as (102) and (106) are permanently secured inside of worm-like body (50) and when snap fasteners are provided at the aft exit points of any boreholes, such as (78) or (100). This variation of FIG. 14, therefore encourages ease of alternate rigging methods and various hooks and leaders in combination on a single spitting soft-bodied surface fishing lure. When equipped with snap fasteners at each of these aft exit points along the length of wormlike body (50), it becomes very easy for the end user to vary the system of rigging, as well as the number and size of hooks being used.

Overview

Figure 16:
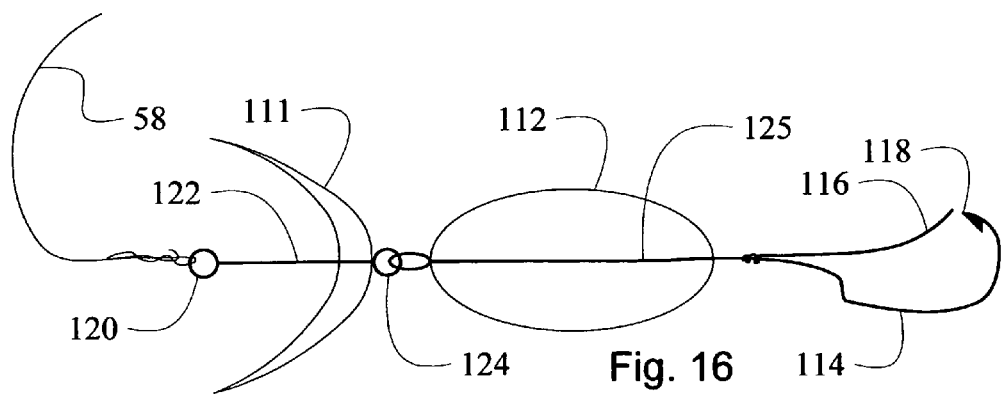
Figure 17:
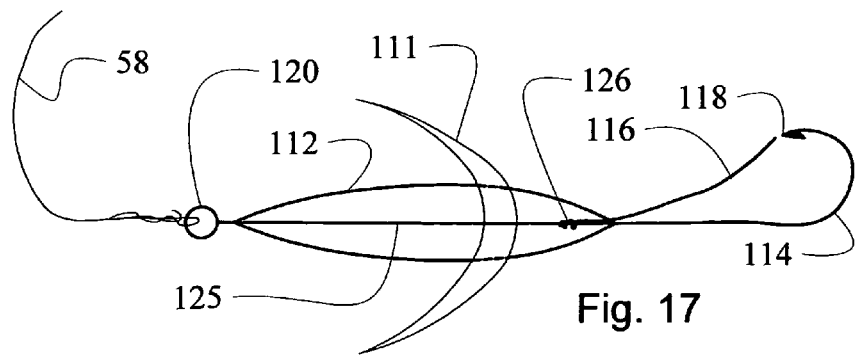

FIG. 15-FIG. 17—Embodiments "E", "F", "G"

Embodiments "E", "F", and "G" cover the broader method of fishing utilizing a Spitting Weedless Surface Fishing Lure, whether or not the fishing lure contains a natural looking bait fabricated of soft polymer plastic, as described in the previous embodiments. These next embodiments also teach three specific methods of combining a floating body (112) with a concaved water deflector (111) and a fish hook (114) in a weedless surface floating fishing lure.

FIG. 15—Embodiment "E"

FIG. 15 illustrates a sectional view of a flexing hook generic body style of fishing lure. It is intended to illustrate the method of the present invention in a more generalized manner, devoid of specific limitations brought about by causing the fishing lure to be formed as a soft bodied and natural appearing bait, as was illustrated in previous embodiments.

In FIG. 15, a fish line at the left of the figure is attached to fish lure connector (120), which is placed forwards of, and attached in a rigid fashion to tensile connector string (122) which is in turn attached in a rigid or semi-rigid fashion to concaved water deflector (111) such that fish lure connector (120) and tensile connector string (122) and concaved water deflector (111) and floating body (112) act together as an essentially rigid body, relative to the force of normal water flow around the entire fishing lure.

It should be noted, that in some embodiments, the tensile connector string (122) may actually represent other physical components of the fishing lure, such as a floating body (112) and concaved water deflector (112) constructed as one unified body, having fish line (120) and fish hook (114) secured at opposite ends such a unified body in a conventional manner. Such a unified body (not separately illustrated) still is structurally equivalent to the present embodiment. It should also be noted that leader (95) of FIG. 11 is one of several other variations possible for tensile connector string (122).

In this embodiment, and the two following embodiments, fish lure connector (120) may represent a single tie ring, snap fastener, swivel connector, or any other conventional means used in fishing lures suitable for the connection to fish line (58). Also, concaved water deflector (111) may represent any variety of forwards facing concave surface, having a scooping type of action at the waterline of the fishing lure, and a curve, curves, or other conventional simple geometric shapes urging the redirection of a stream of water scooped up in front of the concaved water deflector (111) such that water may be redirected and sprayed across the surface of the water. Floating body (112) may represent any body significantly lighter than water that might be conventionally used in fishing lures which may encourage this fishing lure to rest in the surface reliably in a position suitable for the proper scooping action referred to above of the concaved water deflector (111).

Flexible connector (124) is optional, since such a fishing lure will still function with full rigidity between tensile connector string (122) and fishing hook (114). It is shown as a flexible chain-like connector to illustrate the fact that the aft portion of any such fishing lure, which may also contain floatation material similar to floating body (122) may be flexibly mounted, such as is obviously desirable in the case of soft bodied fishing lures. In the later case, the flexible tensile connector (124) may simply represent a flexible section of leader material associated with an otherwise flexible soft bodied polymer plastic bait.

Fish hook (114) is here illustrated as a fishing lure containing a single offset hook, but more generally represents the method of using any conventional style of fish hook or combination of fish hooks, mounted in any manner commonly used in fishing lures. Flexible weedless means (116) demonstrates that any common flexible means (including embedment inside of a flexible bait body, rigged Texas style) for deflecting debris away from barb of fish hook (118) may be utilized to render fish hook (114) weedless and hinder capture of debris by fish hook barb (118).

A weedless fish hook, for the sake of this present invention, is defined as one having a barb flexibly shielded from snagging floating debris by conventional weedless means. Note, in FIGS. 15-17 that deflector connector means (126) is illustrated—giving the more specific variation of utilizing a piece of spring wire secured to a fish hook shaft as a conventional weedless means. But, each of these FIGS. 15-17 is intended to illustrate the more general method of utilizing any conventional flexible weedless means (116), including but not limited to the use of wires, flexible plastic, stiff hairs, covering of the barb of fish hook in a penetrate-able soft material, and etc. to render fish hook (114) weedless.

FIG. 16 Embodiment "F"

FIG. 16 also illustrates a sectional view of a flexing generic body of a fishing lure, and specifically illustrates a different method of connecting the elements of this invention, resulting in a slightly different behavior and embodiment. While most reference numerals indicate the same parts as FIG. 15 above, note several major differences:

Note that fish lure connector (120) is moved along a rigid tensile connector string (122) to a more forwards position relative to concaved water deflector (1111). This has the hydro-dynamic effect of placing the water induced drag of concaved water deflector (111) a predetermined distance behind fish lure connector (120) such that hydro-dynamic effects result in alignment of concaved water deflector (111) in a forwards direction irrespective of flexing of flexible tensile connector (124) located a short distance behind concaved water deflector (111). Of course, in the case of soft bodied fishing lures, this degenerates into flexible tensile connector (124) being made up of the combination of a soft flexible polymer body and a flexible leader or flexible coupling of some conventional sort, similar to that displayed in embodiments A through D.

Note, that in this embodiment E, there is some notable advantage to distributing floating body (112) more broadly on the fishing lure, perhaps dividing it such that there is some degree of floatation located forwards of flexible tensile connector (124) whereby concaved water deflector (111) may be encouraged to float in its desired position with its scooping action occurring at the water line.

FIG. 17—Embodiment "G"

FIG. 17 illustrates a sectional view of a hook based generic body for the fishing lure. It represents the method of rendering the fishing lure essentially rigid longitudinally, locating the concaved water deflector (111) in a more rearwards position relative to fish lure connector (120) for the same reasons stated in embodiment "F" above, and configuring the entire fishing lure about the lengthened fish hook shaft (125) which extends the entire length of the fishing lure.

In this embodiment, floating body (112) may simply represent a light weight floating material such as closed cell plastic, wood, cork, hollow plastic, etc.—being distributed along the length of fish hook shaft (125) in position or positions encouraging the floatation of concaved water deflector (111) in the proper position relative to the surface of the water. As in each of the previous embodiments, it is possible to substitute a fish hook (114) that has double or triple hooks, rather than the single hook as illustrated, that hook or hooks being rendered weedless by any conventional weedless means.

In any embodiment E, F, or G, it is to be understood that floating body (112) may take the form of natural appearing soft flexible polymer plastic bodies as in embodiments A, B, C, and D. It is also to be understood that common fishing lure attractants of any sort commonly employed on fishing lures may be used to further attract the attention of fish by visual, scent, or auditory means. For instance, use of scents or odors incorporated into floating body (112) or other elements of the fishing lure—as well as the use of colorful, flashy, specular, or eye catching decoration or skirts as is common in fishing lure practice. Things like color patterns, sparkling or specular elements, flexible appendages, and odors or scents that tend to attract fish may be added, so long as these do not inhibit the operation of the central claims of this invention. These may be included within the floating body (112) of the fishing lure, or distributed externally in any conventional configuration known to be useful in the attracting of fish to strike a fishing lure.

CONCLUSIONS, RAMIFICATIONS, AND SCOPE

Accordingly, the reader will see that the "Spitting Weedless Surface Fishing Lure" provides a means for effectively fishing for large fish, such as bass, that like to lurk out of sight beneath lily pads and other floating weeds and debris.

Furthermore, this new fishing lure provides the following additional advantages:

It allows weedless recovery of the fishing lure over the top of surface floating debris, without snagging.

It provides a surface splash that uniquely creates noise and vibration while being retrieved that is particularly useful in getting the attention of fish that are hiding out of sight.

It may provides a bait that may visually appear to be a believable natural prey for most fish It simulates violently struggling prey that has fallen into the water, and is fighting for its life, to stay afloat.

Although the description above contains many specifications, these should not be construed as limiting the scope of the invention but as merely providing illustrations of the preferred embodiments of this invention. For example: soft bodied versions of the fishing lure may be cast in the shape of any natural or fanciful prey suitable for fishing. Skirts, hairs, appendages and other exterior additions known to be attractive to fish may be added to the fishing lure as described. Sparkling or colorful inclusions may be placed inside or attached to the outside of the fishing lure that might visually increase its attractiveness to fish. And finally, flavors and odors attractive to fish may be placed inside of, or cast into the floating body of the fishing lure.

Thus, the scope of the invention should be determined by the appended claims and their legal equivalents, rather than the examples given.

I claim:

1. A weedless and surface floating fishing lure consisting of:
    a) a floating body composed of soft flexible polymer plastic formed to resemble soft bodied natural prey of fishes and including floatation means whereby the fishing lure floats on the water surface during fish line retrieval, said soft flexible polymer plastic having vacuoles, wherein the vacuoles allow the floating body to float, and wherein said floating body includes elements that contain and slowly release chemical fish attractants by dissolution in water;

b) said floating body including, at an end thereof, a forwards facing concave surface, capable of straddling the waterline, whereby water caught in front of said forwards facing concave surface during retrieval of said fishing lure is redirected into the air, creating a splash across a surface of the water to attract the attention of fishes, the floating body behind the concave surface forming sinusoidal oscillations in response to the retrieval of the fishing lure; and c) said fishing lure including at least one fishing hook inserted completely through the forwards facing concave surface and a portion of the floating body adjacent the forwards facing concave surface wherein a point and a barb of the at least one fishing hook is inserted back into the floating body resulting in the point and the barb being buried inside of the floating body rendering the at least one fishing hook weedless, a portion of the at least one fishing hook between ends of the at least one fishing hook extending out of the floating body behind the concave surface, wherein one or more boreholes penetrate through said forwards facing concave surface, through said floating body, and extend outwards through a side of said floating body at one or more places along a length of said floating body whereby the at least one fishing hook or a leader is capable of being coupled through said one or more boreholes to the fishing line.

2. The weedless and surface floating fishing lure of claim 1 wherein said at least one fish hook is provided with a floatation sleeve secured about and surrounding a shaft of said at least one fish hook whereby said at least one fish hook is rendered to possess neutral or positive buoyancy.

3. The weedless and surface floating fishing lure of claim 1 wherein the leader comprises a rigid or flexible leader permanently secured inside said one or more boreholes, the leader having, at one end of the leader a connector for connecting to the fishing line at an entrance end of the one or more boreholes and at an other end of the leader an other connector for securing the at least one fishing hook at an exit end of the one or more boreholes, the at least one fishing hook capable of being secured at one or more positions along the length of said floating body.

4. The weedless and surface floating fishing lure of claim 1 wherein the floating body includes multiple flexible floating appendages at substantial angles to a midline of the floating body, whereby said multiple flexible floating appendages serve to generate mild disturbance on the surface of the water when said fishing lure is gently retrieved.

* * * * *